(12) United States Patent
Yahia

(10) Patent No.: US 11,679,642 B2
(45) Date of Patent: Jun. 20, 2023

(54) COOLANT CIRCUIT FOR A VEHICLE

(71) Applicant: Valeo Systemes Thermiques, Le Mesnil Saint-Denis (FR)

(72) Inventor: Mohamed Yahia, Le Mesnil Saint Denis (FR)

(73) Assignee: Valeo Systemes Thermiques, Le Mesnil Saint-Denis (FR)

(*) Notice: Subject to any disclaimer, the term of this patent is extended or adjusted under 35 U.S.C. 154(b) by 259 days.

(21) Appl. No.: 17/279,264

(22) PCT Filed: Sep. 26, 2019

(86) PCT No.: PCT/FR2019/052276
§ 371 (c)(1),
(2) Date: Mar. 24, 2021

(87) PCT Pub. No.: WO2020/065230
PCT Pub. Date: Apr. 2, 2020

(65) Prior Publication Data
US 2022/0048358 A1     Feb. 17, 2022

(30) Foreign Application Priority Data
Sep. 26, 2018   (FR) ...................... 1858794

(51) Int. Cl.
*F25B 7/00*    (2006.01)
*B60H 1/00*    (2006.01)
*B60H 1/32*    (2006.01)

(52) U.S. Cl.
CPC ..... *B60H 1/00278* (2013.01); *B60H 1/00392* (2013.01); *B60H 1/323* (2013.01); *B60H 1/32284* (2019.05); *B60H 2001/00307* (2013.01)

(58) Field of Classification Search
CPC ............ B60H 1/00278; B60H 1/32284; B60H 1/00392; B60H 1/323; B60H 2001/00307
(Continued)

(56) References Cited

U.S. PATENT DOCUMENTS
2018/0111443 A1    4/2018  Kim et al.

FOREIGN PATENT DOCUMENTS
| CN | 104169111 A | * 11/2014 |
| DE | 102012224484 A1 | 7/2014 |

(Continued)

OTHER PUBLICATIONS

International Search Report and Written Opinion issued in corresponding International Patent Application No. PCT/FR2019/052276, dated Dec. 17, 2019 (10 pages).

*Primary Examiner* — Davis D Hwu
(74) *Attorney, Agent, or Firm* — Osha Bergman Watanabe & Burton LLP

(57) ABSTRACT

The invention relates to a circuit (1) for coolant (47) comprising a main duct (3), a first branch (4), a second branch (5) and a third branch (25), the main duct (3) comprising a compression device (2) and a main heat exchanger (8) arranged to be traversed by an external air flow (EF), the first branch (4) comprising a first heat exchanger (13) thermally coupled to a loop (14) for heat transfer liquid (48) and an accumulation device (15), the second branch (5) comprising a second heat exchanger (17), the third branch (25) comprising a third heat exchanger (26), characterised in that the first branch (4) and the second branch (5) are parallel and meet at a convergence point (6), the first branch (4) and the third branch (25) meet at a first junction point (19). Application to motor vehicles.

12 Claims, 7 Drawing Sheets

Figure 1:
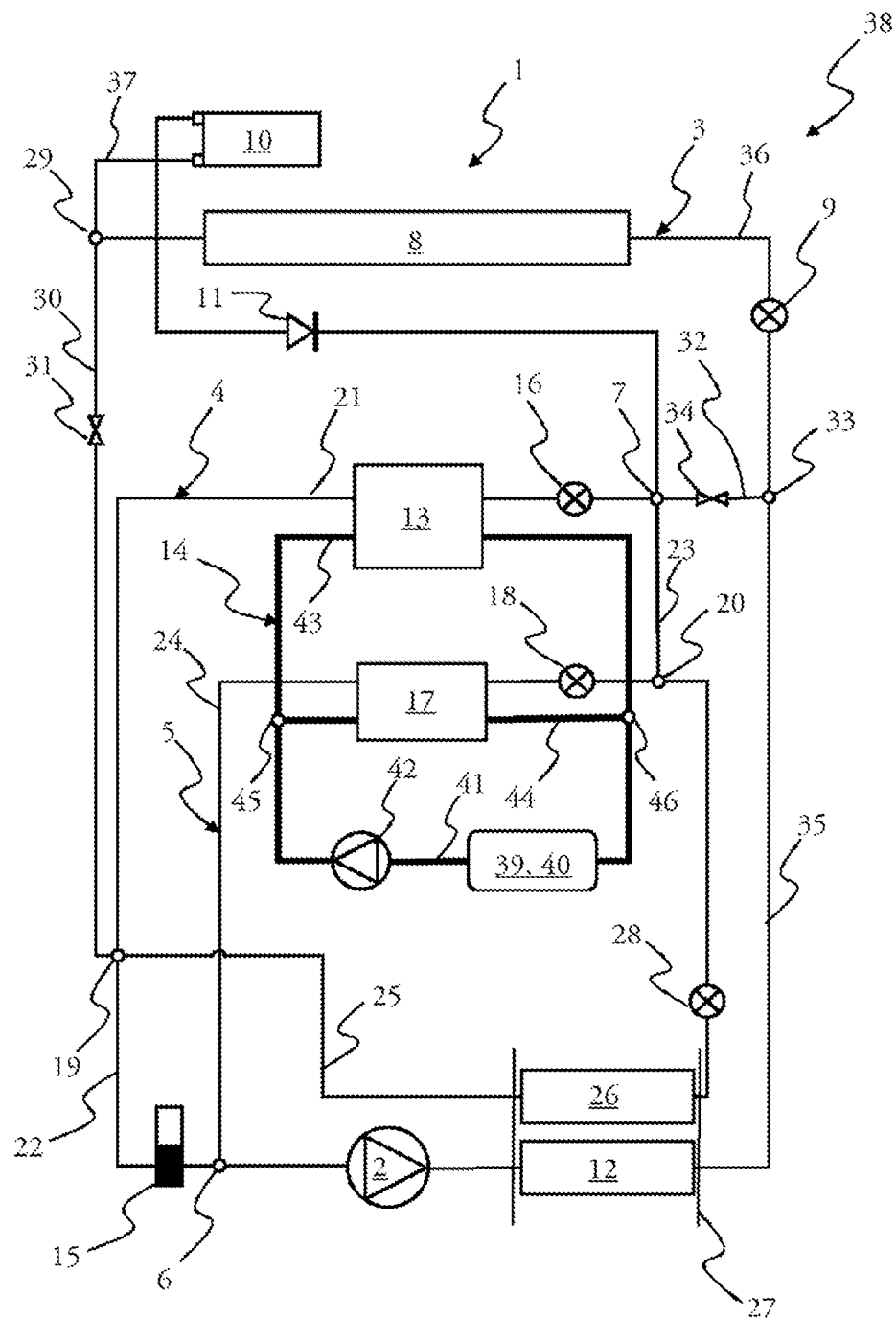

(58) Field of Classification Search
USPC .............................................................. 62/79
See application file for complete search history.

(56) References Cited

FOREIGN PATENT DOCUMENTS

| EP | 2796810 A1 | 10/2014 |
| EP | 3118035 A1 | 1/2017 |

* cited by examiner

COOLANT CIRCUIT FOR A VEHICLE

The field of the present invention is that of refrigerant circuits for vehicles, in particular for motor vehicles.

Motor vehicles are currently equipped with a refrigerant circuit used to heat or cool various zones or various components of the vehicle. It is particularly known practice for this refrigerant circuit to be used to thermally treat an air flow sent into the interior of the vehicle equipped with such a circuit.

In another application of this circuit, it is known practice to use same to cool the part of an electric traction driveline of the vehicle. This part is notably an electrical storage device used to supply power to an electric motor capable of causing said vehicle to move. The refrigerant circuit thus provides the energy capable of cooling the electrical storage device when it is used during driving phases. The refrigerant circuit is thus designed to cool this electrical storage device for temperatures that remain moderate.

It is also known practice for the electrical storage device of the vehicle to be charged by connecting it for several hours to the domestic grid. This long charging technique allows the temperature of the electrical storage device to be kept below a certain threshold, which allows any system for cooling the electrical storage device to be dispensed with.

A new, rapid-charging, technique has recently been developed. It involves charging the electrical storage device at a high voltage and amperage, so as to charge the electrical storage device over a short time of a few minutes. This rapid charging causes heating of the electrical storage device, which needs to be cooled. This heating governs the rating of the components because this is the situation that is the most severe. This rating has a strong impact on normal operation outside of rapid charging, particularly because of the superheating generated downstream of the cooler for the electrical storage device.

The technical problem therefore lies in the ability, on the one hand, to dissipate heat energy generated by the part of the electric traction driveline of the vehicle and, on the other hand, to cool the vehicle interior while at the same time maintaining a level of circuit performance considered to be acceptable.

The invention falls within this context and proposes a technical solution which seeks to achieve this objective, namely to keep the electrical storage device below a threshold temperature and/or to cool the vehicle interior to a given level of performance, by means of a refrigerant circuit cleverly designed to operate with two heat exchangers which are dedicated to the cooling of a part of the electric traction driveline of the vehicle, and a third heat exchanger which is dedicated to cooling the vehicle interior, making it possible in a simple and economic way to achieve superheating at the inlet to the compression device.

One subject of the invention is, therefore, a refrigerant circuit for a vehicle, the circuit comprising at least a main pipe, a first leg, a second leg and a third leg all three of these in series with the main pipe, the main pipe comprising at least a compression device for compressing the refrigerant and a main heat exchanger arranged in such a way as to have an external air flow external to an interior of the vehicle passing through it, the first leg comprising at least a first heat exchanger thermally coupled to a loop for a heat-transfer liquid and an accumulator device for accumulating the refrigerant, the second leg comprising at least a second heat exchanger thermally coupled to the loop for heat-transfer fluid, the third leg comprising at least a third heat exchanger designed to have passing through it an interior air flow sent into the vehicle interior, characterized in that the first leg and the second leg are in parallel and meet at a point of convergence located between the accumulator device and the compression device, and in that the first leg and the third leg meet at a first junction point located between the first heat exchanger and the accumulator device. The first heat exchanger and the third heat exchanger are intended to supply the accumulation device with refrigerant, while the second heat exchanger is connected in such a way as to bypass the accumulation device. The second heat exchanger is actually connected downstream of the accumulation device, from the viewpoint of the refrigerant. The second heat exchanger is able to generate superheating in the refrigerant. This refrigerant is in gaseous form when superheated. The refrigerant in the gaseous state coming from the second heat exchanger therefore arrives at the compression device directly, and this contributes to elevating the coefficient of performance of the circuit. What is meant by "directly" is that there is no bottle or accumulation device between the second heat exchanger and the compression device.

When the first heat exchanger and the second heat exchanger are operating together, the refrigerant close to the saturated vapor state (vapor content close to 0.95 in particular) coming from the accumulation device and the superheated gaseous refrigerant coming directly from the second heat exchanger converge in the main pipe at the point of convergence. This refrigerant is therefore mixed and moderately superheated. This superheating induces an overall improvement to the coefficient of performance of the circuit.

The fact that the first heat exchanger is connected upstream of the accumulation device from the refrigerant viewpoint, and that the second heat exchanger is connected downstream of the accumulation device means that the operation of the latter can be dissociated from that of the third heat exchanger, for example during motorway running with moderate cooling of the electrical storage device that is very well below the maximum cooling capability during rapid charging. In the absence of such a setup, the circuit could be operated in such a way as to flood the first heat exchanger in order to compensate for the superheating of the second heat exchanger, although this complicates the optimization and the control device.

The first heat exchanger is configured to thermally treat at least one part of an electric traction driveline of the vehicle, such as an electric storage device used to supply power to an electric motor capable of causing said vehicle to move, and/or an electronic unit and/or the electric motor per se. The first heat exchanger therefore operates as an evaporator.

The second heat exchanger is configured to thermally treat at least one part of the electric traction driveline of the vehicle, such as an electric storage device used to supply power to an electric motor capable of causing said vehicle to move, and/or an electronic unit and/or the electric motor. The second heat exchanger therefore operates as an evaporator.

Advantageously, the first heat exchanger and the second heat exchanger are assigned to the thermal treatment of the one same part of an electric traction driveline of the vehicle, for example the electrical storage device.

The first heat exchanger and the second heat exchanger each allow an exchange of heat energy between the refrigerant and the part of the electric traction driveline of the vehicle, either directly, namely by convection between the first heat exchanger and the part of the electric traction driveline of the vehicle, and/or the second heat exchanger and the part of the electric traction driveline of the vehicle.

In such a case, the cooling of the element of the electric traction driveline of the vehicle is direct. Alternatively, the exchange of heat energy may be performed indirectly via the loop for heat-transfer liquid, this loop being intended to carry the heat energy from the part of the electric traction driveline of the vehicle towards the first heat exchanger and/or second heat exchanger. It will therefore be appreciated that the cooling of the element of the electric traction driveline of the vehicle can be indirect.

The first heat exchanger and the second heat exchanger are each individualized, in the sense that they can be positioned in the vehicle at distinct locations, being physically distant from one another.

The third heat exchanger can be installed in a heating, ventilation, and/or air conditioning installation. This third heat exchanger can thus be used as an evaporator in order to cool the air flow sent into the vehicle interior.

The first junction point is a point of convergence of the circuit. The refrigerant coming from the first heat exchanger and from the third heat exchanger may converge at the first junction point.

The compression device is, for example, a compressor, and the invention is particularly applicable when the compressor is a fixed cylinder-capacity, variable-speed electric compressor. It is thus possible to control the thermal power of the circuit according to the invention.

The main heat exchanger can be used as a condenser. It is located on the front face of the vehicle in order to benefit from a supply of external air flow during the running phase. The main heat exchanger may be used as an evaporator when the circuit is able to operate as a heat pump.

The refrigerant is, for example, a sub-critical fluid, as known under reference R134A or R1234YF. The refrigerant circuit according to the invention is a closed circuit which implements a thermodynamic cycle.

The first leg and the second leg of the circuit are parallel from the refrigerant viewpoint. The first leg and the second leg of the circuit are each in series with the main pipe from the refrigerant viewpoint.

According to one aspect of the invention, the main pipe extends between the point of convergence and a point of divergence, the point of divergence being a point beyond which the first leg and the second leg become separate.

According to one aspect of the invention, the main pipe comprises a subcooling unit located between the main heat exchanger and the point of divergence. The main heat exchanger is associated with the refrigerant subcooling unit. The subcooling unit is able to generate subcooling of the refrigerant, namely to lower the temperature of the refrigerant to below its condensation temperature.

According to one aspect of the invention, the subcooling unit is a fourth heat exchanger designed to have the external air flow external to the vehicle interior passing through it and being installed so that the external air flow passes through it before this air passes through the main heat exchanger. The subcooling unit may thus be located together with the main heat exchanger on the front face of the vehicle in order to benefit from the supply of external air flow during running phases. The external air flow passes first of all through the subcooling unit. Then, on leaving the subcooling unit, the external air flow passes through the main heat exchanger.

When the subcooling unit and the main heat exchanger are both used to cool the refrigerant, the external air flow performs a first exchange of heat with the subcooling unit and then a second exchange of heat with the main heat exchanger, in that order.

According to one aspect of the invention, the first leg comprises the first junction point and the second leg comprises a second junction point, the third leg of the circuit extending between the first junction point and the second junction point.

The second junction point is a point of divergence of the circuit. The refrigerant coming from the main pipe may divide at the second junction point to feed the second heat exchanger and the third heat exchanger.

The third leg is parallel to at least a first part of the first leg, the first part of the first leg comprising at least the first heat exchanger, and a second part of the first leg comprising at least the accumulation device.

According to one aspect of the invention, the main pipe comprises a main expansion member. The main expansion member is upstream of the main heat exchanger from the refrigerant viewpoint. When the main heat exchanger is operating as a condenser, the main expansion member is inoperative. It is therefore fully open. When the main heat exchanger is operating as an evaporator, the main expansion member expands the refrigerant.

According to one aspect of the invention, the first leg comprises a first expansion member. The first expansion member is upstream of the first heat exchanger from the refrigerant viewpoint.

According to one aspect of the invention, the second leg comprises a second expansion member. The second expansion member is upstream of the second heat exchanger from the refrigerant viewpoint.

According to one aspect of the invention, the third leg comprises a third expansion member. The third expansion member is upstream of the third heat exchanger from the refrigerant viewpoint.

The main expansion member, the first expansion member, the second expansion member and/or the third expansion member are, for example, electronic expansion valves. They may be equipped with a shut-off function. When the shut-off function is not part of one and/or another of the expansion members, the shut-off function is offset upstream of said relevant expansion member and performed by a dedicated component.

One and/or another of these expansion members may be fully open or partially open. When open, they do not modify the state of the refrigerant passing through them: they are then qualified as inoperative and are fully open. When they are closed, they prevent the refrigerant from passing. When they are partially open, they expand the refrigerant, thus influencing the refrigerating power supplied by the relevant heat exchanger.

According to one aspect of the invention, the accumulation device is located between the first junction point and the point of convergence. Thus, the accumulation device can be supplied by the first heat exchanger and/or by the third heat exchanger and/or by the main heat exchanger.

According to one aspect of the invention, the main pipe comprises a fifth heat exchanger located between the compression device and the main heat exchanger, the fifth heat exchanger being designed to have passing through it the interior air flow sent into the vehicle interior. This fifth heat exchanger can be installed in the heating, ventilation, and/or air conditioning installation. This fifth heat exchanger is used as a condenser in order to heat the air flow sent into the vehicle interior. This fifth heat exchanger may thus be installed, jointly with the third heat exchanger, in the heating, ventilation, and/or air conditioning installation. When there is a fifth heat exchanger operating as a condenser, the main heat exchanger is able to operate as an evaporator, in heat pump mode.

According to one aspect of the invention, the main pipe comprises a third junction point located between the main heat exchanger and the point of divergence, a fourth leg extending between the third junction point and the first junction point, the fourth leg comprising at least one shut-off valve. The third junction point is a point of divergence of the circuit. The shut-off valve can be either open or closed, allowing or not allowing the refrigerant to circulate in the fourth leg. The first junction point is a point of convergence of the refrigerant coming from the fourth leg, from the first heat exchanger and from the third heat exchanger.

According to one aspect of the invention, the third junction point is located between the main heat exchanger and the subcooling unit. The refrigerant coming from the main heat exchanger may divide at the third junction point to feed the fourth leg, and therefore the first junction point and the accumulation device and the subcooling unit.

According to one aspect of the invention, the circuit comprises a fifth leg which connects the main pipe to the point of divergence, the fifth leg comprising at least one shut-off valve. The shut-off valve can be either open or closed, allowing or not allowing the refrigerant to circulate in the fifth leg.

The fifth leg extends between the point of divergence and a fourth junction point located in the main pipe between the fifth heat exchanger and the main heat exchanger. Advantageously, the fourth junction point is located between the fifth heat exchanger and the main expansion member. Thus, when the main expansion member is closed, the refrigerant takes the fifth leg to arrive at the point of divergence of the circuit.

According to one aspect of the invention, the first heat exchanger is configured to produce a thermal power greater than that of the second heat exchanger. The first heat exchanger and the second heat exchanger have different thermal performance. This difference may stem from the fact that the first heat exchanger and the second heat exchanger are different models, for example in terms of size, in terms of shape and/or designed using technologies and/or materials that give them distinct thermal performance characteristics. For example, the first heat exchanger is configured for a higher flow rate of refrigerant. According to another example in which these heat exchangers are identical plate-type exchangers, the first heat exchanger has a greater number of plates than the second heat exchanger.

The first heat exchanger and/or the second heat exchanger are used according to the demand for cooling of the part of the electric traction driveline that is cooled by the loop for heat-transfer liquid. During the running phase, the demand for cooling is low, and it is the second heat exchanger that is therefore used. In the rapid-charging phase, it is the first heat exchanger that provides a large proportion of the required power. The second heat exchanger provides support and allows a superheated operating point at the inlet to the compression device, hence improving the operating cycle.

According to one aspect of the invention, the circuit comprises an internal heat exchanger having two passes, a low-pressure pass being located in the main pipe between the point of convergence and the compression device, and a high-pressure pass being located in the main pipe between the subcooling unit and the point of divergence.

According to an alternative aspect of the invention, the circuit comprises an internal heat exchanger having two passes, the low-pressure pass being located between the accumulation device and the point of convergence, and a high-pressure pass being located in the main pipe between the subcooling to unit and the point of divergence.

The invention also relates to a system for the thermal treatment of a vehicle comprising the refrigerant circuit for refrigerant as described hereinabove and a loop for heat-transfer liquid thermally coupled to the refrigerant circuit via the first heat exchanger and the second heat exchanger, the first heat exchanger and the second heat exchanger being assigned to the thermal treatment of at least one same part of an electric traction driveline of the vehicle.

The heat-transfer liquid loop is a closed-circuit which comprises at least a main duct, the first heat exchanger and the second heat exchanger and a circulation-inducing means, such as a pump, able to cause the heat-transfer liquid to circulate in the main duct.

The first heat exchanger and the second heat exchanger thus form part of the refrigerant circuit and of the loop for the heat-transfer liquid. These then are bi-fluid, particularly bi-liquid, heat exchangers, configured to have both the refrigerant and the heat-transfer liquid passing through them. Within, on the one hand, the first heat exchanger and, on the other hand, the second heat exchanger, there is a transfer of heat energy between the refrigerant and the heat-transfer liquid: the heat-transfer liquid is cooled when the first heat exchanger and/or the second heat exchanger operate as an evaporator.

The part of the electric traction driveline of the vehicle is for example an electrical storage device of the vehicle, such as an electric battery or a battery pack. The part of the electric traction driveline may also correspond to an electric traction motor of the vehicle, or to an electronic control unit for the electric traction motor. Said part may, in other words, correspond to any part of the electric traction driveline of the vehicle that needs to be cooled. The thermal treatment may also target a number of these parts.

Figure 5:
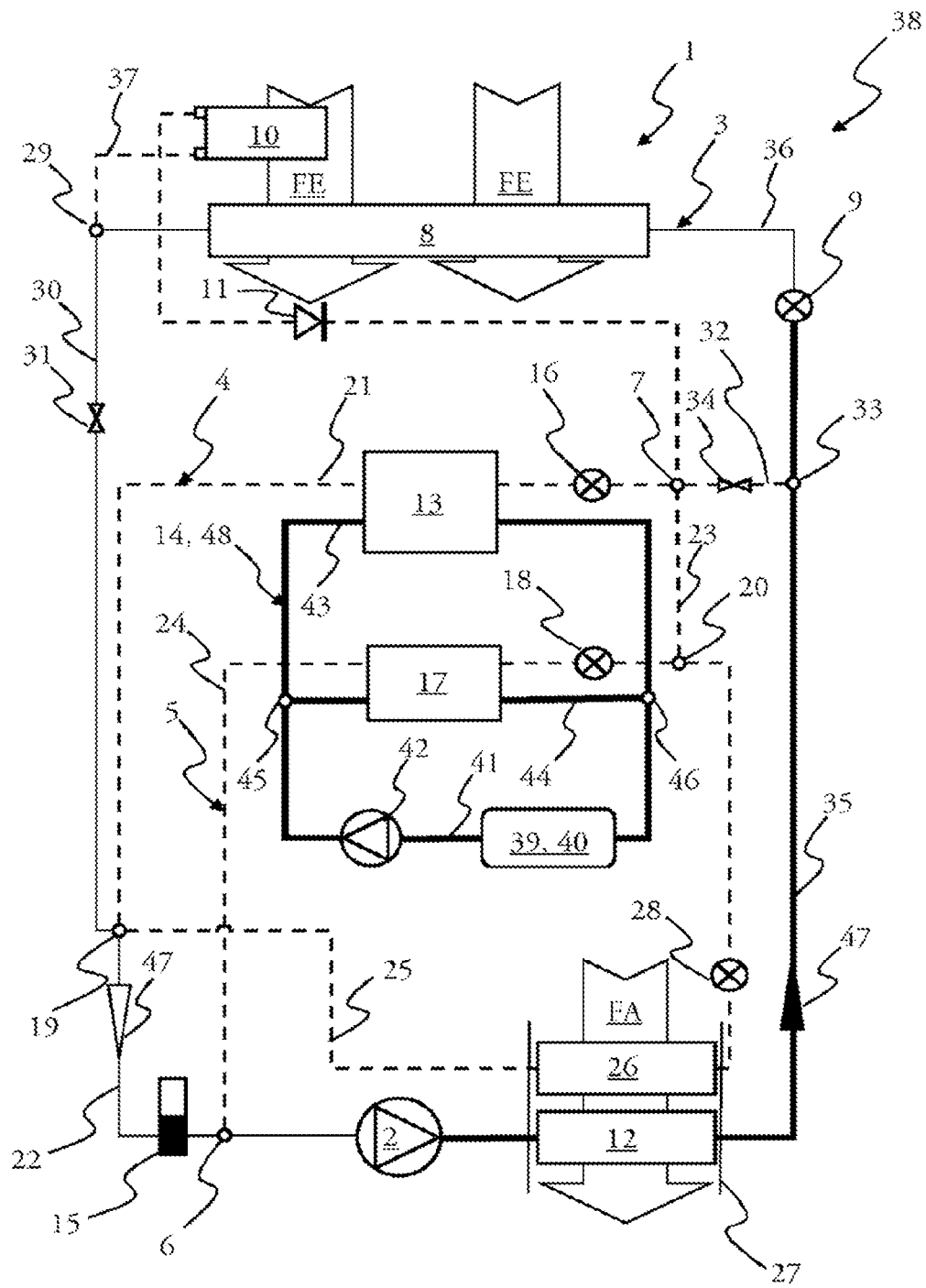
Figure 6:
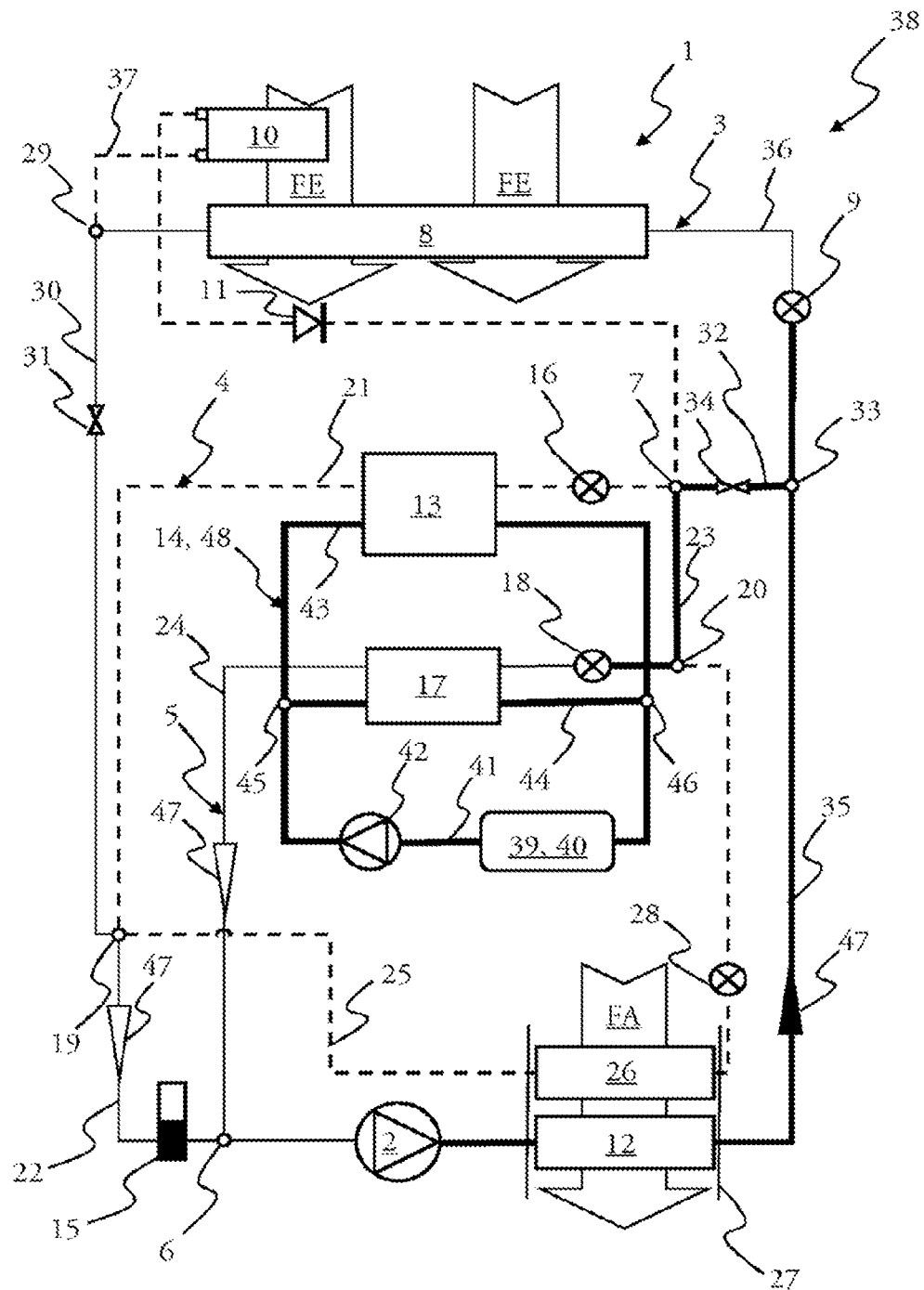
Figure 7:
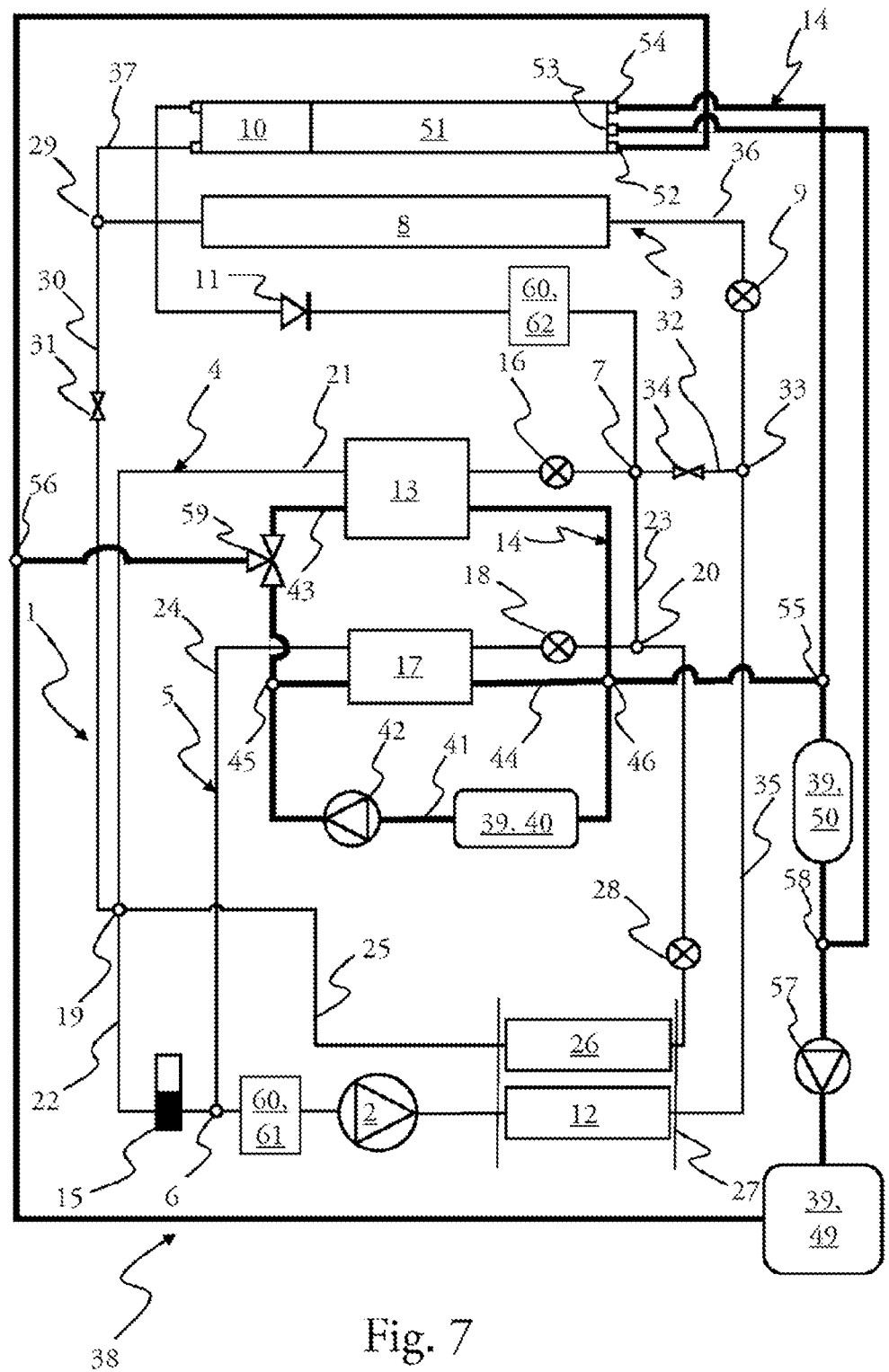

Further features, details and advantages of the invention will become more clearly apparent from reading the description, which is provided hereafter for information purposes, with reference to the drawings, in which:

FIG. 1 is a schematic view of the circuit according to the invention, in a first embodiment, FIGS. 2 to 6 show the circuit which is the subject of the first embodiment operated according to different operating modes consisting in cooling an interior of the vehicle and/or a part of an electric traction driveline of the vehicle, FIG. 7 is a schematic view of the circuit according to the invention, in a second embodiment.

It should first of all be noted that the figures explain the invention in detail for implementing the invention, it being, of course, possible for said figures to serve to better define the invention if necessary. These figures are schematic representations which illustrate how the circuit is made, what makes it up and how the refrigerant circulates within it. In particular, the circuit according to the invention mainly comprises a device for compressing the refrigerant, two heat exchangers coupled to a loop for heat transfer liquid, two heat exchangers exchanging with air, an accumulation device, at least three expansion members and piping connecting each of these components.

The terms upstream and downstream used in the following description refer to the direction of circulation of the fluid in question, that is to say the refrigerant, an interior air flow sent into an interior of the vehicle or an exterior air flow external to the vehicle interior.

In FIGS. 2 to 6, the refrigerant is symbolized by an arrow which illustrates the direction of circulation of the latter in the piping in question. The solid lines illustrate a portion of the circuit where the refrigerant circulates, whereas the broken lines show an absence of circulation of the refrigerant. The high-pressure, high-temperature refrigerant is represented by solid arrows. The low-pressure, low-temperature refrigerant is represented by outlined arrows.

The identifiers "main", "first", "second", etc. are not intended to indicate a level of hierarchy of or to order the terms they accompany. These identifiers serve to distinguish the terms which they accompany and can be interchanged without narrowing the scope of the invention.

FIG. 1 thus shows a circuit 1 according to a first embodiment. This circuit 1 is a closed loop in which a refrigerant is made to circulate by a compression device 2. It will be noted that the compression device 2 can take the form of an electric compressor, that is to say a compressor which comprises a compression mechanism, an electric motor and possibly a controller.

According to the first illustrated embodiment, the circuit 1 comprises at least a main pipe 3, a first leg 4 and a second leg 5. The first leg 4 and the second leg 5 are both in series with the main pipe 3. The first leg 4 and the second leg 5 are in parallel and meet at a point of convergence 6. The main pipe 3 extends between the point of convergence 6 and the point of divergence 7, the point of divergence 7 being the point beyond which the first leg 4 and the second leg 5 become separate.

The main pipe 3 comprises at least the refrigerant compression device 2 and a main heat exchanger 8. The main heat exchanger 8 is designed to have passing through it a flow of air exterior to an interior of the vehicle. Thus, the main heat exchanger 8 is located on the front face of the vehicle so as to be supplied with this external air flow. The main heat exchanger 8 is able to operate as a condenser.

The main pipe 3 comprises a main expansion member 9. It is located upstream of the main heat exchanger 8 from the refrigerant viewpoint. Thus associated with the main expansion member 9, the main heat exchanger 8 is able to operate as an evaporator. The main expansion member 9 may be fully open or partially open or closed, there being a shut-off function incorporated into it.

The main pipe 3 comprises a subcooling unit 10 located between the main heat exchanger 8 and the point of divergence 7. The subcooling unit 10 is a fourth heat exchanger. The subcooling unit 10 is located on the front face of the vehicle so as to be supplied with the external air flow. The main heat exchanger 8 and the subcooling unit 10 are thus found, together, at the front of the vehicle. The subcooling unit 10 is installed in such a way as to have the exterior air flow pass through it before this flow passes through the main heat exchanger 8. From the point of view of the exterior air flow, the fourth heat exchanger is upstream of the main heat exchanger 8.

The main pipe 3 comprises a nonreturn valve 11. The nonreturn valve 11 is located between the subcooling unit 10 and the point of divergence 7. The nonreturn valve 11 prevents the refrigerant from circulating from the point of divergence 7 toward the subcooling unit 10.

The main pipe 3 comprises a first heat exchanger 12, located between the compression device 2 and the main heat exchanger 8. In this example, the fifth heat exchanger 12 is located between the compression device 2 and the main expansion member 9. The fifth heat exchanger 12 is designed to have passing through it a flow of interior air sent into the interior of the vehicle. It is configured to operate as a condenser in a heating, ventilation and/or air-conditioning installation.

The first leg 4 comprises at least a first heat exchanger 13, thermally coupled to a loop 14 for the heat-transfer liquid, and an accumulation device 15 for accumulating the refrigerant.

The first heat exchanger 13 is configured to operate as an evaporator. The first heat exchanger 13 is associated with a first expansion member 16 located upstream of the first heat exchanger 13. The main expansion member 16 may be fully open or partially open or closed, there being a shut-off function incorporated into it.

The accumulation device 15 is upstream of the point of convergence 6 from the refrigerant viewpoint. The accumulation device 15 is able to separate a liquid phase from a gaseous phase of the refrigerant and to accumulate the liquid phase of the refrigerant. The circuit 1 therefore has no bottle of desiccant.

The second leg 5 comprises at least a second heat exchanger 17 thermally coupled to the loop 14 for heat-transfer liquid. The second heat exchanger 17 is configured to operate as an evaporator. The second heat exchanger 17 is associated with a second expansion member 18 located upstream of the second heat exchanger 17. The second expansion member 18 may be fully open or partially open or closed, there being a shut-off function incorporated into it.

The conditions of use of the loop 14 for the heat-transfer liquid may generate superheating of the refrigerant within the second heat exchanger 17. This superheating corresponds to an increase in the temperature of the refrigerant above its saturation temperature for the same pressure.

The point of convergence 6 is located between the accumulation device 15 and the compression device 2. Thus, the accumulation device 15 is able to be supplied with refrigerant by the first heat exchanger 13 and not the second heat exchanger 17.

The first heat exchanger 13 is configured to produce a thermal power greater than that of the second heat exchanger 17. For example, the first heat exchanger 13 is larger in size by comparison with the second heat exchanger 17.

The first leg 4 comprises a first junction point 19 and the second leg 5 comprises a second junction point 20, a third leg 25 of the circuit 1 extending between the first junction point 19 and the second junction point 20.

The first leg 4 divides into a first part 21 and a second part 22. The first part 21 extends from the point of divergence 7 to the first junction point 19. The second part 22 extends from the first junction point 19 to the point of convergence 6. The first expansion member 16 and the first heat exchanger 13 are comprised in the first part 21 of the first leg 4. The accumulation device 15 is itself comprised in the second part 22 of the first leg 4.

The second leg 5 divides into a first segment 23 and a second segment 24. The first segment 23 extends between the point of divergence 7 and the second junction point 20. The second segment 24 extends between the second junction point 20 and the point of convergence 6. The second expansion member 18 and the second heat exchanger 17 are comprised in the second segment 24 of the second leg 5.

The third leg 25 comprises at least a third heat exchanger 26 designed to have passing through it the flow of interior air sent into the interior of the vehicle. The third heat exchanger 26 is configured to operate as an evaporator in a heating, ventilation and/or air-conditioning installation 27 with which the vehicle is equipped. The third heat exchanger 26 is associated with a third expansion member 28 located upstream of the third heat exchanger 26. The third expansion member 28 may be fully open or partially open or closed.

The third heat exchanger 26 is located in the heating, ventilation and/or air-conditioning installation 27 together with the fifth heat exchanger 12. For example, the third heat exchanger 26 is located upstream of the fifth heat exchanger 12, from the viewpoint of the interior air flow.

The third heat exchanger 26 is able to supply refrigerant to the accumulation device 15, the latter being located downstream of the third heat exchanger 26, between the first junction point 19 and the point of convergence 6.

The circuit is configured in such a way that the first heat exchanger 13 operates alone. The second expansion member 18 and the third expansion member 28 are then closed.

The main pipe 3 comprises a third junction point 29 located between the main heat exchanger 8 and the first junction point 19, a fourth leg 30 extending between the third junction point 29 and the first junction point 19. The main heat exchanger 8 is able to supply refrigerant to the accumulation device 15, via the fourth leg 30.

The fourth leg 30 comprises at least one shut-off valve 31. The shut-off valve 31 allows the refrigerant to circulate in the fourth leg 30 when this valve is open, and prevents this circulation when it is closed.

The circuit 1 comprises a fifth leg 32 which connects the main pipe 3 to the point of divergence 7.

The fifth leg 32 extends between a fourth junction point 33 and the point of divergence 7. The fourth junction point 33 is located in the main pipe 3 between the fifth heat exchanger 12 and the main heat exchanger 8. Advantageously, the fourth junction point 33 is located between the fifth heat exchanger 12 and the main expansion member 9.

The fifth leg 32 comprises at least one shut-off valve 34. The shut-off valve 34 allows the refrigerant to circulate in the fifth leg 32 when this valve is open, and prevents this circulation when it is closed.

The main pipe 3 divides into a first portion 35, a second portion 36 and a third portion 37. The first portion 35 extends between the point of convergence 6 and the fourth junction point 33. The compression device 2 and the fifth heat exchanger 12 are comprised in the first portion 35 of the main pipe 3. The second portion 36 extends between the fourth junction point 33 and the third junction point 29. The main expansion member 9 and the main heat exchanger 8 are comprised in the second portion 36 of the main pipe 3. The third portion 37 extends between the third junction point 29 and the point of divergence 7. The subcooling unit 10 and the nonreturn valve 11 are comprised in the third portion 37 of the main pipe 3.

The refrigerant circuit 1 is included in a thermal treatment system 38 of the vehicle. The thermal treatment system 38 comprises the refrigerant circuit 1 and the loop 14 for heat transfer liquid. The loop 14 for heat transfer liquid and the refrigerant circuit 1 are thermally coupled via the first heat exchanger 13 and the second heat exchanger 17.

The first heat exchanger 13 and the second heat exchanger 17 are assigned to the thermal treatment of at least one same part 39 of an electric traction driveline of the vehicle. In the example of FIG. 1, the first heat exchanger 13 and the second heat exchanger 17 are assigned to the thermal treatment of an electrical storage device 40 of the vehicle.

The heat-transfer liquid loop 14 is a closed-circuit 1 which comprises at least a main duct 41, the first heat exchanger 13 and the second heat exchanger 17, and a circulation-inducing means 42. In the example of FIG. 1, the heat-transfer liquid loop 14 comprises the main duct 41, a first duct 43 and a second duct 44 extending between a first connection point 45 and a second connection point 46. The main duct 41 is in series with the first duct 43 and with the second duct 44 from the viewpoint of the heat-transfer liquid. The first duct 43 and the second duct 44 are in parallel with one another from that same viewpoint.

The main duct 41 comprises the electrical storage device 40 and the circulation-inducing means 42. The electrical storage device 40 is located between the second connection point 46 and the circulation-inducing means 42. The first duct 43 comprises the first heat exchanger 13. The second duct 44 comprises the second heat exchanger 17.

The circulation-inducing means 42 is able to allow the heat-transfer liquid to circulate in the main duct 41. For example, the circulation-inducing means 42 is a pump.

FIGS. 2 to 6 show the circuit 1 according to the invention in the embodiment shown in FIG. 1. FIGS. 2 to 6 corresponds to various situations requiring the thermal treatment of the interior and/or of the electrical storage device 40 of the vehicle. The cooling powers required vary according to the modes of operation presented. As a result, one and/or the other of the heat exchangers or of the fifth heat exchanger 12 are in demand.

Figure 2:
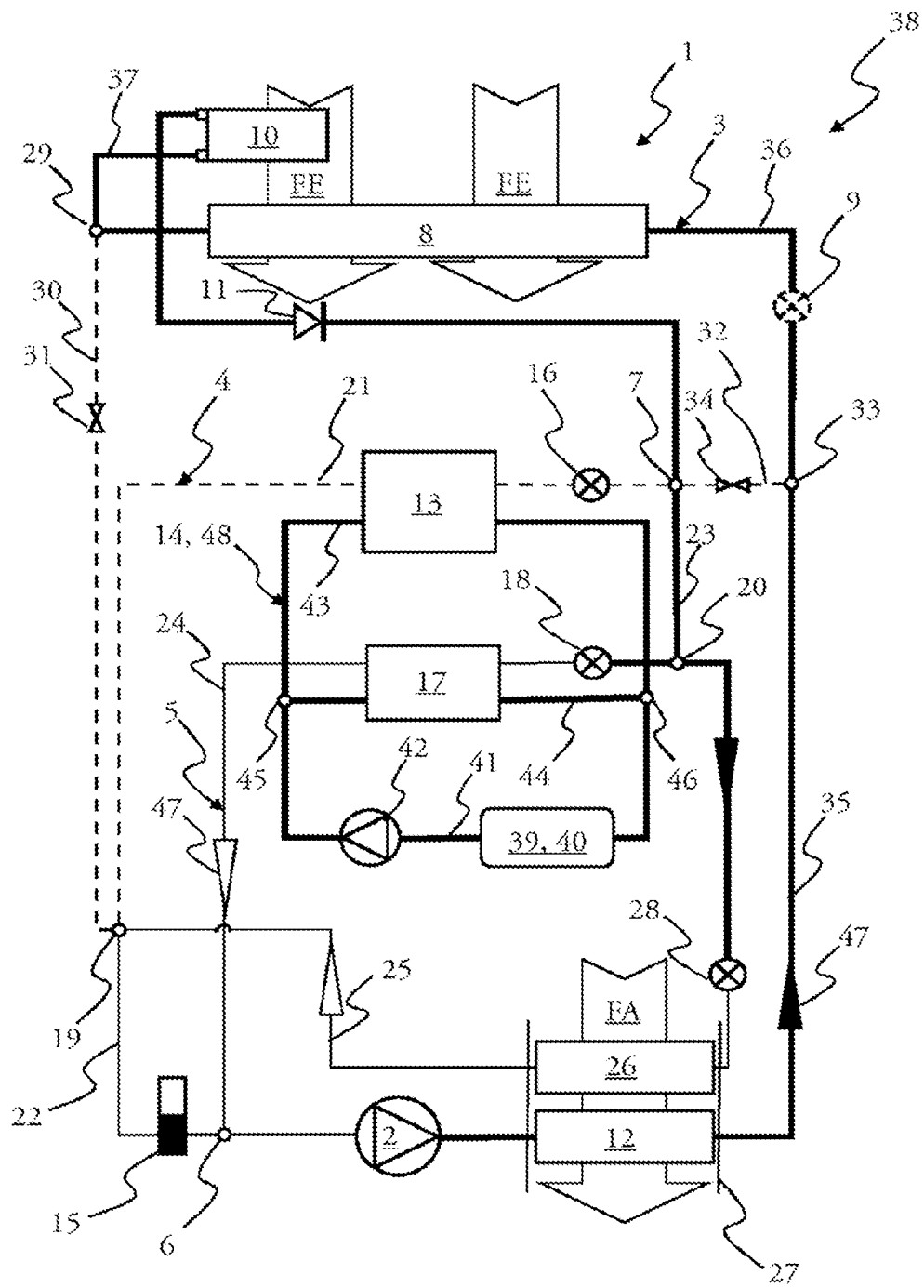

FIG. 2 illustrates the circuit 1 according to the invention used in air-conditioning mode and performing thermal treatment of the electrical storage device 40 during a running phase. This mode of operation allows simultaneous cooling of the vehicle interior and of the electrical storage device 40. The cooling of the interior is performed by the third heat exchanger 26. The cooling of the electrical storage device 40 is performed only by the second heat exchanger 17.

In the example of FIG. 2, the compression device 2 imposes a high-pressure and high-temperature on a refrigerant 47 inside the main pipe 3. It is in that state that the refrigerant 47 passes through the fifth heat exchanger 12, rendered inoperative.

The refrigerant 47 passes the fourth junction point 33 to enter the second portion 36 of the main pipe 3, the shut-off valve 34, then closed, preventing it from passing through the fifth leg 32.

In the second portion 36 of the main pipe 3, the refrigerant 47 passes through the main expansion member 9 which is fully open. It therefore does not undergo any expansion therein.

In the example of FIG. 2, the main heat exchanger 8 is operating as a condenser. The exterior air flow FE passes through it, at least a portion of which air flow has previously passed through the subcooling unit 10. The refrigerant 47 transfers heat energy to the exterior air flow FE, and condenses. Beyond the main heat exchanger 8, the refrigerant 47 passes through the third junction point 29 and reaches the third portion 37 of the main pipe 3, the shut-off valve 31 being closed. It undergoes subcooling as it passes through the subcooling unit 10 which at the same time has the exterior air flow FE passing through it.

Next, the refrigerant 47 passes through the nonreturn valve 11 as far as the point of divergence 7. Because the first expansion member 16 is closed, the refrigerant 47 enters the second leg 5 and the third leg 25, the second expansion member 18 and the third expansion member 28 allowing it to pass as they are partially open.

In the second leg 5, the refrigerant 47, which is at high pressure and at high temperature, undergoes expansion brought about by the second expansion member 18. It passes through the second heat exchanger 17 at low pressure and at low temperature. As it does so, the refrigerant 47 performs an exchange of heat with the loop 14 for heat-transfer liquid 48 within the second heat exchanger 17 so as to cool the heat-transfer liquid 48. The thermal conditions imposed by the part of the electric traction driveline 39 allow superheating of the refrigerant 47 which is therefore completely in the gaseous phase. It is in this superheated state that the refrigerant 47 reaches the point of convergence 6.

In the third leg 25, the refrigerant 47, which is at high pressure and at high temperature, undergoes expansion brought about by the third expansion member 28. It passes through the third heat exchanger 26 at low pressure and at low temperature. As it does so, the refrigerant 47 performs an exchange of heat with the interior air flow FA intended for the vehicle interior. On leaving the third heat exchanger 26, the refrigerant 47 is in biphasic form. Within the accumulation device 15, the liquid phase is separated, and it is essentially the gaseous phase that reaches the point of convergence 6.

At the point of convergence 6, the superheated refrigerant 47 coming from the second leg 5 and the refrigerant 47 coming from the third leg 25 mix before reaching the compression device 2 with a modest degree of superheating at which a thermodynamic cycle is completed.

In the example of FIG. 2, the refrigerant 47 circulates through the entirety of the main pipe 3, through the second leg 5 and through the third leg 25. It does not circulate in the first leg 4, due to the closure of the first expansion member 16 and neither does it circulate in the fourth leg 30, due to the closure of the shut-off valve 31, and neither does it circulate in the fifth leg 32, due to the closure of the shut-off valve 34. The second junction point 20 is the point at which the refrigerant 47 divides, whereas the point of convergence 6 is a point at which the refrigerant 47 converges.

In the example of FIG. 2, the heat-transfer liquid 48 circulates in at least the main duct 41 and in the second duct 44, so as to cool the part 39 of the electric traction driveline, for example the electrical storage device 40.

Figure 3:
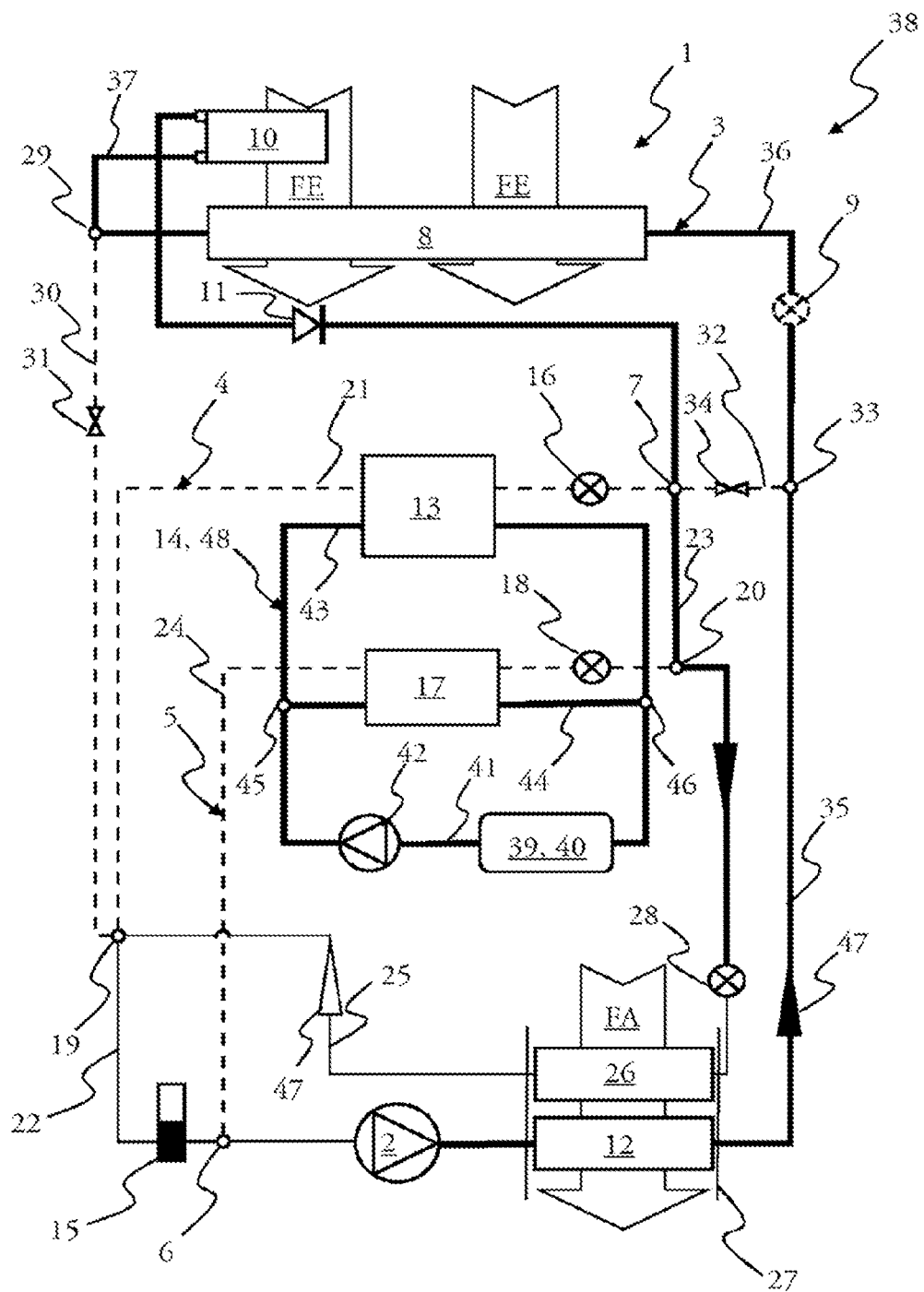

FIG. 3 illustrates the circuit 1 according to the invention operated exclusively in air conditioning mode, during the running phase. This mode of operation allows the vehicle interior to be cooled by use of the third heat exchanger 26 of the heating, ventilation and/or air-conditioning installation 27.

The differences compared with what was described in FIG. 2 will be described hereinafter. With the exception of these differences, the description of FIG. 2 applies mutatis mutandis and reference can be made thereto with regard to the implementation of the invention described in FIG. 3.

In the example of FIG. 3, the first expansion member 16 and the second expansion member 18 are closed. As a result, the refrigerant 47 does not circulate in the second segment 24 of the second leg 5. At the second junction point 20, it takes only the second leg 25. The point of convergence 6 does not receive superheated refrigerant 47 coming from the second leg 5.

In the example of FIG. 3, the refrigerant 47 circulates through the entirety of the main pipe 3, through the first segment 23 of the second leg 5 and through the third leg 25. It does not circulate in the first leg 4, due to the closure of the first expansion member 16 and neither does it circulate in the second segment 24 of the second leg 5, due to the closure of the second expansion member 18, and neither does it circulate in the fourth leg 30, due to the closure of the shut-off valve 31, and neither does it circulate in the fifth leg 32, due to the closure of the shut-off valve 34.

Figure 4:
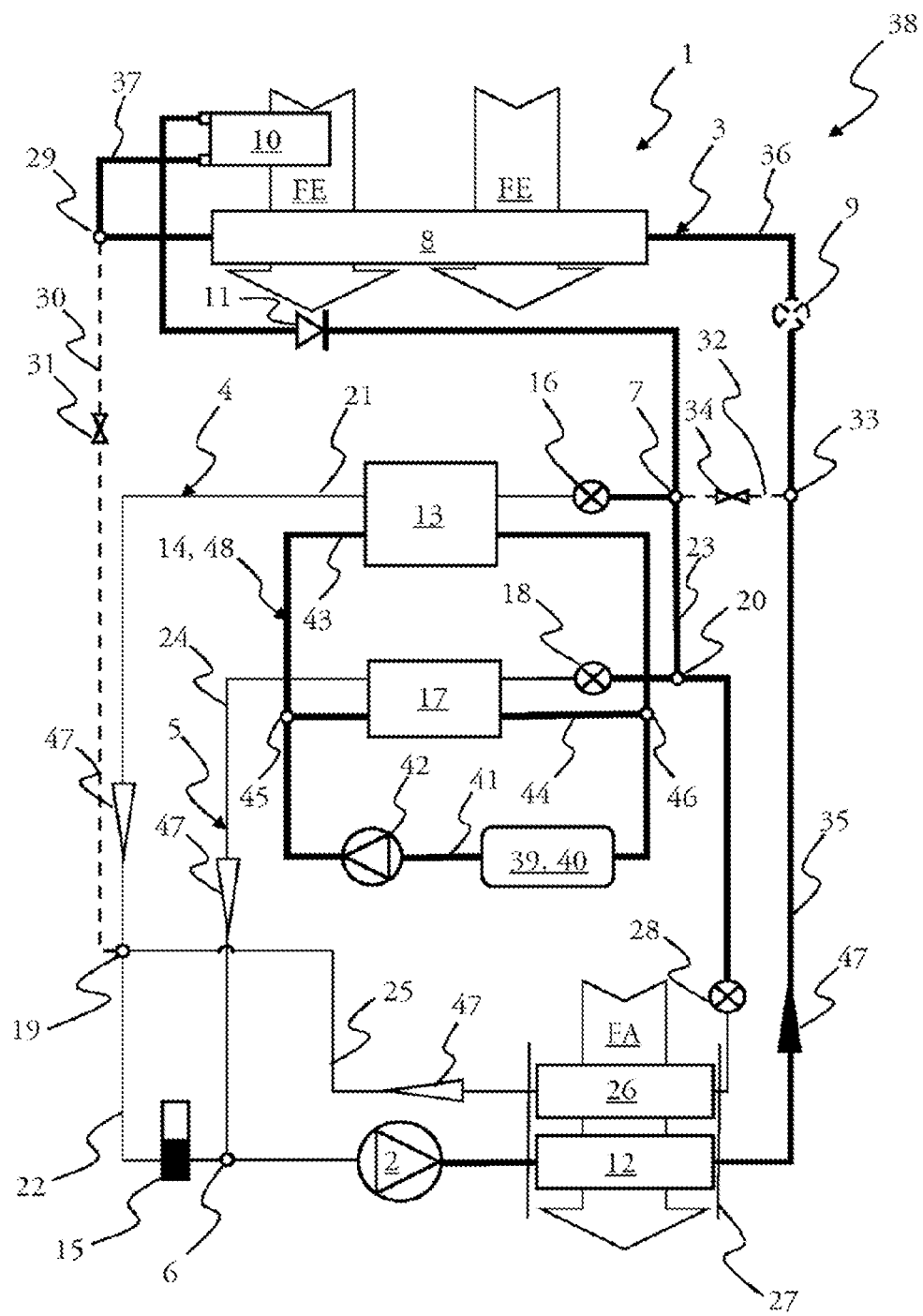

FIG. 4 illustrates the circuit 1 according to the invention used in air-conditioning mode and performing thermal treatment of the electrical storage device 40 during rapid charging of said electrical storage device 40. This mode of operation is used for example when the occupants remain inside the vehicle while it is stationary and charging. This mode of operation allows the simultaneous cooling of the vehicle interior and of the electrical storage device 40, the latter having a greater need for cooling in comparison with the running phase. The heating of the interior is performed by the fifth heat exchanger 12. The cooling of the electrical storage device 40 is performed by the first heat exchanger 13 and the second heat exchanger 17. The point of convergence 6 receives a mixture of superheated and not-superheated refrigerant 47.

In the example of FIG. 4, the refrigerant 47 circulates as described for FIG. 2, in except in respect of the first leg 4. The circulation in the first leg 4 will be described hereinafter. In the case of the other legs, and in the case of the main pipe 3, reference may be made to the description given for FIG. 2, which applies mutatis mutandis.

In the first leg 4, the refrigerant 47 circulates and undergoes expansion brought about by the first expansion member 16. Next, having thus been brought down to a low temperature and a low pressure, it exchanges heat within the first heat exchanger 13, through which the heat-transfer liquid 48 simultaneously passes. In the second branch 5, the refrigerant 47 circulates as described for FIG. 2. Thus, the electrical storage device 40 is cooled by joint heat treatment by the first heat exchanger 13 and by the second heat exchanger 17 in order to meet its increased need for cooling.

The refrigerant 47 coming from the first leg 4 and from the third leg 25 reaches the first junction point 19 before entering the accumulation device 15. Beyond this accumulation device 15, the refrigerant 47 in the gaseous state mixes with the superheated refrigerant 47 coming from the second leg 5, which has been vaporized in the second heat exchanger 17.

In the example of FIG. 4, the heat-transfer liquid 48 circulates in the entirety of the loop 14 for the heat-transfer liquid 48 in order to cool the electrical storage device 40 by virtue of the simultaneous operation of the first heat exchanger 13 and of the second heat exchanger 17.

FIG. 5 illustrates the circuit 1 according to the invention operated in interior-heating mode, during the running phase.

In the example of FIG. 5, the compression device 2 imposes a high-pressure and high-temperature on the refrigerant 47 inside the main pipe 3. It is in that state that the refrigerant 47 passes through the fifth heat exchanger 12. The refrigerant 47 exchanges with the interior air flow FA as it passes through the fifth heat exchanger 12. The latter is therefore used as a condenser for the refrigerant 47. In so doing, the interior air flow FA is heated and heats the vehicle interior.

The refrigerant 47 passes the fourth junction point 33 to enter the second portion 36 of the main pipe 3 and the fifth leg 32, the shut-off valve 34 being closed.

In the second portion 36 of the main pipe 3, the main expansion member 9 expands the refrigerant 47, which passes from the high pressure and high temperature to the low pressure and low temperature. The main heat exchanger 8 operating as an evaporator allows the refrigerant 47 to recover heat energy coming from the exterior air flow FE.

At the third junction point 29, the refrigerant 47 passes through the fourth leg 30 as far as the first junction point 19, the shut-off valve 31 being open. The refrigerant 47 is actually drawn through by the compression device 2 downstream. Thus, the refrigerant 47 does not follow the third portion 37 of the main pipe 3. The refrigerant 47 reaches the compression device 2 via the accumulation device 15.

In the example of FIG. 5, the refrigerant 47 circulates through the first portion 35 and the second portion 36 of the main pipe 3, through the fourth leg 30 and through the second part 22 of the first leg 4. It does not circulate in the third portion 37 of the main leg, nor in the first leg 4, due to the closure of the first expansion member 16, and neither does it circulate in the second leg 5, due to the closure of the second expansion member 18, and neither does it circulate in the third leg 25, due to the closure of the third expansion member 28, and neither does it circulate in the fifth leg 32, due to the closure of the shut-off valve 34.

FIG. 6 illustrates the circuit 1 according to the invention operated in a mode that provides interior-heating and in a mode that provides cooling of the part 39 of the electric traction driveline, during the running phase. This mode of operation thus allows simultaneous heating of the vehicle interior and cooling of the electrical storage device 40. The heating of the vehicle interior is performed by the fifth heat exchanger 12, according to the embodiment described in FIG. 5. The cooling of the electrical storage device 40 is performed by the second heat exchanger 17, according to the embodiment described in FIG. 2. The point of convergence 6 receives a mixture of superheated and not-superheated refrigerant 47.

The differences compared with what was set out for FIG. 5 will be described hereinafter. With the exception of these differences, the description of FIG. 5 applies mutatis mutandis and reference can be made thereto with regard to the implementation of the invention according to FIG. 6.

At the fourth junction point 33, the refrigerant 47 takes the fifth leg 32, the shut-off valve 34 being open. It then circulates in the second leg 5 as described in FIG. 4, to which reference may be made for implementing the invention described in FIG. 6.

In the example of FIG. 6, the refrigerant 47 circulates through the first portion 35 and the second portion 36 of the main pipe 3, through the fourth leg 30, through the second part 22 of the first leg 4, through the first leg 32 and through the second leg 5. It does not circulate in the third portion 37 of the first leg 4, and neither does it circulate in the first leg 4, due to the closure of the first expansion member 16, and neither does it circulate in the third leg 25, due to the closure of the third expansion member 28. The fourth junction point 33 is a point at which the refrigerant 47 divides, and the point of convergence 6 is a point at which the refrigerant 47 converges.

In the example of FIG. 6, the heat-transfer liquid 48 circulates in at least the main duct 41 and in the second duct 44, so as to perform the exchange of heat between the refrigerant 47 and the heat-transfer liquid 48.

FIG. 7 shows a second embodiment of the thermal management system 38 that includes the circuit 1 according to the invention. The differences compared with what was set out for FIG. 1 will be described hereinafter. With the exception of these differences, the description of FIG. 1 applies mutatis mutandis and reference can be made thereto with regard to the implementation of the invention according to FIG. 7. The differences lie in the circuit 1 according to the invention and in the loop 14 for heat-transfer liquid 48. However, either one of these differences may be found separately in other embodiments.

In the example of FIG. 7, the circuit 1 according to the invention comprises an internal heat exchanger 60 with two passes 61, 62.

A low-pressure pass 61 is preferably located in the main pipe 3 between the point of convergence 6 and the compression device 2. Alternatively, the low-pressure pass 61 is located between the accumulation device 15 and the point of convergence 6.

A high-pressure pass 62 is located in the main pipe 3, between the subcooling unit 10 and the point of convergence 7, more particularly between the nonreturn valve 11 and the point of divergence 7.

The low-pressure pass 61 and high-pressure pass 62 are depicted in FIG. 7 without apparent connection in order to make FIG. 7 easier to understand. However, it must be appreciated that the low-pressure pass 61 and the high-pressure pass 62 form part of the one same internal heat exchanger 60, so that an exchange of heat can take place between the low-pressure refrigerant circulating in the low-pressure pass 61 and the high-pressure refrigerant circulating in the high-pressure pass 62.

In the example of FIG. 7, the first heat exchanger 13 and the second heat exchanger 17 are assigned to the thermal treatment of the one same part 39 of the electric traction driveline of the vehicle, namely the electrical storage device 40. The loop 14 for heat-transfer liquid 48 and illustrated in FIG. 7 is able to thermally treat two other parts 39 of the electric traction driveline of the vehicle, namely an electric motor 49 and an electronic control unit 50 for controlling this electric motor 49. To supplement the cooling that can be provided by the first heat exchanger 13 and the second heat exchanger 17, the electric storage device 40 enjoys additional cooling, achieved by a radiator 51 located on the front face of the vehicle, together with the subcooling unit 10. The radiator 51 is configured to have the external air flow FE external to the vehicle pass through it. With respect to this external air flow FE, the radiator 51 is upstream of the main heat exchanger 8.

The radiator 51 is able to generate two temperature levels for the heat-transfer liquid within it. In order to do this, the radiator 51 comprises an inlet 52, a first outlet 53 and a second outlet 54 which are parallel to one another. The first outlet 53 is able to deliver the heat transfer liquid at a first temperature level, and the second outlet 54 is able to deliver the heat-transfer liquid at a second temperature level different than the first temperature level. The first outlet 53 is able to supply the electric motor 49, benefiting from the first temperature level. The second outlet 54 is able to supply the electric storage device 40 and the electronic unit 50, benefiting from the second temperature level.

The loop 14 for heat-transfer liquid 48 comprises a third connection point 55 and a fourth connection point 56. The third connection point 55 is a point intended to divide the heat-transfer liquid 48 so that it heads, on the one hand, toward the second connection point 46 and, on the other hand, toward the electronic unit 50. The fourth connection point 56 is a point intended to cause the heat-transfer liquid 48 coming, on the one hand, from the first connection point 45 and, on the other hand, from the electric motor 49, to converge.

In order to circulate the heat-transfer liquid 48 coming from the first outlet 53 of the radiator 51, the loop 14 for heat-transfer liquid 48 is provided with an additional displacement means 57 for causing the heat-transfer liquid to move. The additional displacement means 57 is located between the first outlet 53 and the electric motor 49. It is for example a pump.

Between the first outlet 53 of the radiator 51 and the additional displacement means 57 for causing the heat-transfer liquid to move, there is a fifth connection point 58. The fifth connection point 58 is a region of convergence able to cause the heat-transfer liquid 48 coming from the first outlet 53 and that coming from the electronic unit 50 to converge.

The first duct 43 comprises a three-way valve 59. The three-way valve 49 is a point at which the heat-transfer liquid 48 may diverge. The heat-transfer liquid 49 is circulated by the circulation-inducing means 52 which imposes the direction in which the heat-transfer liquid 49 circulates. In particular, the first heat exchanger 13 and the second heat exchanger 17 are located upstream of the electrical storage device 40 from the viewpoint of the heat-transfer liquid 49. Thus, because of the direction of circulation imposed by the device 42 that induces the circulation of the heat-transfer liquid 49, the heat-transfer liquid 49 coming from the first connection point 45 is able to feed into the three-way valve 59, which is itself able to deliver the heat-transfer liquid 48 on the one hand, towards the first heat exchanger 13, and on the other hand toward the fourth connection point 56. The three-way valve 59 has a shut-off function able to prevent or allow one and/or the other of these deliveries.

It will be understood from the foregoing that the present invention thus makes it possible to ensure simply, without excess consumption and at a reduced noise level, the cooling of a part of an electric traction driveline of a vehicle, such as an electrical storage device configured to supply electrical energy to an electric drive motor of the vehicle, as well as the thermal treatment of the vehicle interior by cooling an interior air flow sent into the vehicle interior. The coefficient of performance of the circuit is thus improved, particularly during the mode of rapid charging simultaneously with the cooling of the vehicle interior.

The invention is by no means limited to the means and configurations described and illustrated herein, and it also extends to any equivalent means or configurations and to any technically operational combination of such means. In particular, the architecture of the refrigerant circuit can be modified without detracting from the invention insofar as it ultimately fulfils the functionalities described in this document.

The invention claimed is:

1. A refrigerant circuit for a vehicle, the circuit comprising:
   at least a main pipe;
   a first leg;
   a second leg; and
   a third leg, all three of the first, second, and third legs in series with the main pipe,
   the main pipe comprising at least a compression device for compressing the refrigerant and a main heat exchanger arranged in such a way as to have an external air flow external to an interior of the vehicle passing through it,
   the first leg comprising at least a first heat exchanger thermally coupled to a loop for a heat-transfer liquid and an accumulator device for accumulating the refrigerant,
   the second leg comprising at least a second heat exchanger thermally coupled to the loop for heat-transfer fluid, the third leg comprising at least a third heat exchanger configured to have passing through it an interior air flow sent into the vehicle interior,
   wherein the first leg and the second leg are in parallel and meet at a point of convergence located between the accumulator device and the compression device, and
   wherein the first leg and the third leg meet at a first junction point located between the first heat exchanger and the accumulator device.

2. The circuit as claimed in claim 1, wherein the main pipe extends between the point of convergence and a point of divergence, the point of divergence being a point beyond which the first leg and the second leg become separate.

3. The circuit as claimed in claim 2, wherein the main pipe comprises a subcooling unit located between the main heat exchanger and the point of divergence.

4. The circuit as claimed in claim 3, the subcooling unit is a fourth heat exchanger designed to have the external air flow external to the vehicle interior passing through it and being installed so that the external air flow passes through it before this air passes through the main heat exchanger.

5. The circuit as claimed in claim 2, wherein the first leg comprises the first junction point and the second leg comprises a second junction point, the third leg of the circuit extending between the first junction point and the second junction point.

6. The circuit as claimed in claim 5, wherein the main pipe comprises a fifth heat exchanger located between the compression device and the main heat exchanger, the fifth heat exchanger being configured to have passing through it the interior air flow sent into the vehicle interior.

7. The circuit as claimed in claim 5, wherein the main pipe comprises a third junction point located between the main heat exchanger and the point of divergence, a fourth leg extending between the third junction point and the first junction point, the fourth leg comprising at least one shut-off valve.

8. The circuit as claimed in claim 2, further comprising a fifth leg which connects the main pipe to the point of divergence, the fifth leg comprising at least one shut-off valve.

9. The circuit as claimed in claim 1, wherein the first heat exchanger is configured to produce a thermal power greater than that of the second heat exchanger.

10. The circuit as claimed in claim 3, further comprising an internal heat having two passes, a low-pressure pass being located in the main pipe between the point of convergence and the compression device, and a high-pressure pass being located in the main pipe between the subcooling unit and the point of divergence.

11. The circuit as claimed in claim 3, further comprising an internal heat exchanger having two passes, a low-pressure pass being located between the accumulation device and the point of convergence, and a high-pressure pass being located in the main pipe between the subcooling unit and the point of divergence.

12. A system for the thermal treatment of a vehicle comprising:
   the refrigerant circuit for refrigerant comprising:
      at least a main pipe,
      a first leg, a second leg, and a third leg, all three legs in series with the main pipe,
      the main pipe comprising at least a compression device for compressing the refrigerant and a main heat exchanger arranged in such a way as to have an external air flow external to an interior of the vehicle passing through it,
      the first leg comprising at least a first heat exchanger thermally coupled to a loop for a heat-transfer liquid and an accumulator device for accumulating the refrigerant,
      the second leg comprising at least a second heat exchanger thermally coupled to the loop for heat-transfer fluid, the third leg comprising at least a third heat exchanger configured to have passing through it an interior air flow sent into the vehicle interior, wherein the first leg and the second leg are in parallel and meet at a point of convergence located between the accumulator device and the compression device, and wherein the first leg and the third leg meet at a first junction point located between the first heat exchanger and the accumulator device; and a loop for heat-transfer liquid thermally coupled to the refrigerant circuit for refrigerant fluid via the first heat exchanger and the second heat exchanger, the first heat exchanger and the second heat exchanger being assigned to the thermal treatment of at least one same part of an electric traction driveline of the vehicle.

* * * * *